United States Patent [19]

Carpentier

[11] Patent Number: 4,480,812
[45] Date of Patent: Nov. 6, 1984

[54] TRAP WITH REDUCED FORCE OPENING MEANS

[75] Inventor: Urgel R. Carpentier, Plattsburgh, N.Y.

[73] Assignee: Plattsburgh Foundry, Inc., Plattsburgh, N.Y.

[21] Appl. No.: 531,629

[22] Filed: Sep. 14, 1983

Related U.S. Application Data

[63] Continuation of Ser. No. 334,660, Dec. 28, 1981, abandoned, and a continuation-in-part of Ser. No. 112,332, Jan. 15, 1980, Pat. No. 4,308,894, and Ser. No. 112,333, Jan. 15, 1980, Pat. No. 4,307,747.

[51] Int. Cl.³ ............................................. F16K 25/00
[52] U.S. Cl. ...................................... 251/87; 251/298
[58] Field of Search ...................... 251/85, 86, 87, 298

[56] References Cited

U.S. PATENT DOCUMENTS

| | | | |
|---|---|---|---|
| 1,777,580 | 10/1930 | Russell | 251/87 |
| 2,992,655 | 7/1961 | Davis | 251/85 |
| 3,182,951 | 5/1965 | Spencer | 251/85 |
| 3,257,045 | 6/1966 | Carpentier | 251/360 |
| 3,307,573 | 3/1967 | Epstein | 251/298 |
| 3,550,904 | 12/1970 | Vawter | 251/298 |
| 4,121,607 | 10/1978 | Bader | 251/298 |
| 4,307,747 | 12/1981 | Carpentier | 251/360 |
| 4,308,894 | 1/1982 | Carpentier | 137/630.15 |

FOREIGN PATENT DOCUMENTS

| | | | |
|---|---|---|---|
| 909786 | 3/1954 | Fed. Rep. of Germany | 251/298 |
| 148378 | 5/1981 | Fed. Rep. of Germany | 251/298 |
| 400776 | 12/1942 | Italy | 251/85 |

*Primary Examiner*—Martin P. Schwadron
*Assistant Examiner*—Sheri Novack
*Attorney, Agent, or Firm*—LeBlanc, Nolan, Shur & Nies

[57] ABSTRACT

A dust trap having an annular valve seat and a pivoted valve flap closing the same including an off-center connection between the actuating means for said pivoted flap and said flap thereby to lessen the force required to open the valve passageway against the force of vacuum.

4 Claims, 3 Drawing Figures

TRAP WITH REDUCED FORCE OPENING MEANS

CROSS REFERENCE TO RELATED APPLICATIONS

This application is a continuation of my application Ser. No. 334,660, filed Dec. 28, 1981, now abandoned and is a continuation-in-part of my companion pending patent applications Ser. No. 112,332, filed Jan. 15, 1980 for DUST TRAP WITH EQUALIZING VALVE, now U.S. Pat. No. 4,308,894 issued Jan. 5, 1982, and Ser. No. 112,333, filed Jan. 15, 1980 for DUST TRAP WITH REMOVABLE SEAT, now U.S. Pat. No. 4,307,747, issued Dec. 29, 1981.

BACKGROUND OF THE INVENTION

The present invention relates to a dust trap and valve for controlling flow through the dust trap, and more particularly to an eccentric mounting of an operating lever or arm with respect to the valve flap to facilitate opening of the valve flap with relatively lower effort and torque.

Dust traps of the type herein referred to have been used for years in collection systems such as bag houses wherein a valve seat and matching valve flap closes a dust collecting zone, as beneath a series of vacuum bags, and the valve flap is opened from time to time to dump the contents collected above the flap. In the usual operation of such devices and as set forth in the above noted companion applications, the disclosures of which are incorporated herein by reference and also in my previously issued U.S. Pat. No. 3,257,054 entitled DUST TRAP AND VALVE THEREFOR, there is a substantial pressure differential across the valve flap when closed which can call for the use of substantial force to break the vacuum and pull the valve flap away from its seat.

It is the purpose of this invention to so position the flap actuating lever with respect to the flap in an eccentric or off-center manner so as to initially lift only one edge of the valve flap plate while the other remote edge therefrom serves as a fulcrum, thereby to initially break the vacuum prior to full opening and swing removal of the valve plate.

As a consequence, the torque required on the operating shaft for opening the valve is reduced and the accompanying power requirements for the operating motor or manual actuator are substantially lessened.

DESCRIPTION OF THE DRAWINGS

These and other objects and advantages of the invention will become apparent upon reference to the following specification taken with the accompanying drawings in which.

DETAILED DESCRIPTION OF THE INVENTION

Figure 1:
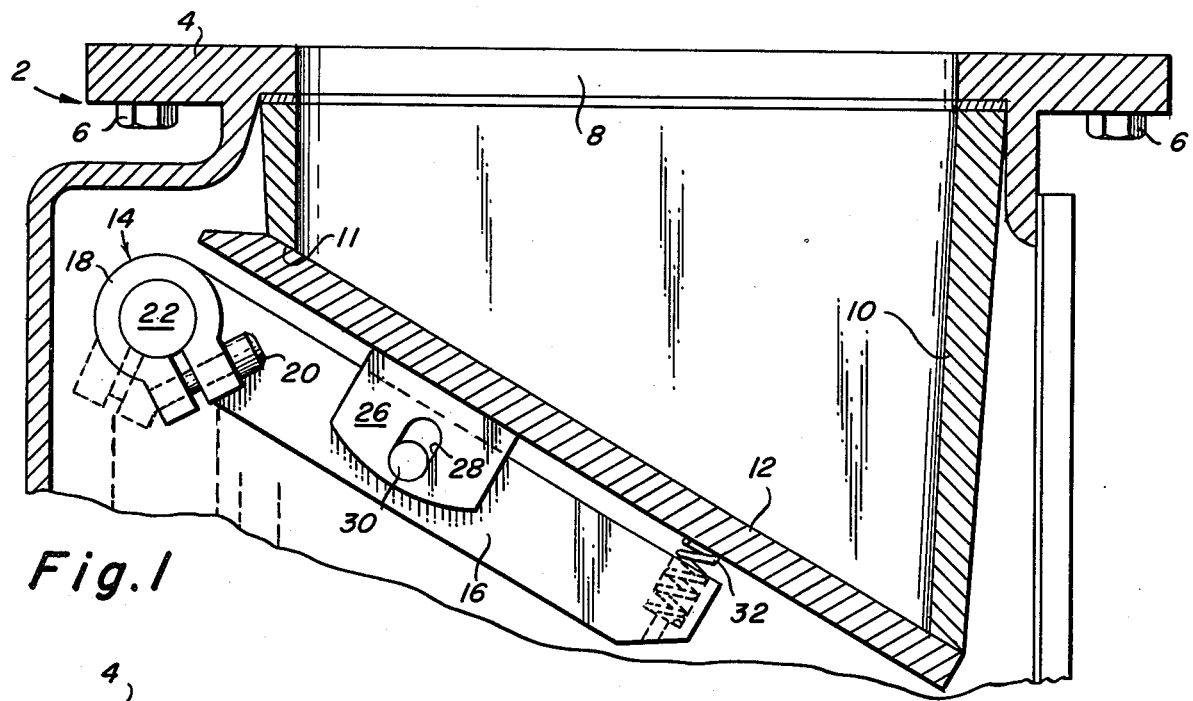
FIG. 1 is a side elevation partially in section showing a valve body including a valve seat and a matching valve flap in the closed position.

Referring to FIG. 1, a valve body 2 of usual form is provided having a flange 4 which is secured by bolts 6 into a vacuum system thereabove in conventional manner. The valve body defines a central flow path therethrough indicated by passageway 8 and a rectangular hollow valve seat 10 is suitably mounted in the valve body and defines an angled and polished seating face 11 in usual manner. The valve seat may be of the readily removable type as shown in my companion application Ser. No. 112,333, above noted.

The valve seat 10 is closed by a valve flap 12 which is supported for movement into and out of engagement with the valve seat, and includes preferably polished surfaces mating with seating face 11 to minimize air leakage. More particularly, the valve flap or plate 12 is supported and moved by a drive arrangement shown generally at 14 which includes a lever or operating arm 16 having an integral collar 18 which is suitably affixed as by bolt 20 to a shaft 22. The shaft 22 extends outwardly through the valve body 2 and is mounted for power rotational movement externally of the valve body as by hydraulic, mechanical, or manual force whereby upon rotation of shaft 22, arm 16 will pivot with the shaft.

Figure 3:
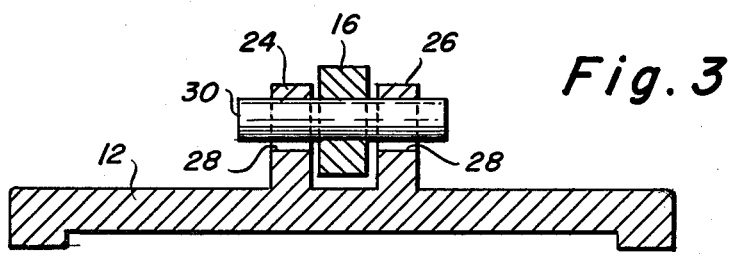

The distal end of lever 16 is connected to flap 12 to move the same into or out of engagement with the valve seat 10. To this end it will be seen that the valve flap or plate 12 includes a pair of upstanding ears 24, 26 which are provided with elongated aligned slots 28. The arm 16 extends from its pivot connection to shaft 22 to lie between the upstanding ears 24, 26 as seen in FIG. 3 and is provided with a transverse pin 30 frictionally fitted or otherwise held on the arm 16, the pin 30 extending respectively into the slots 28 of each ear.

To facilitate the connection between the operating arm 16 and the valve plate ears 24, 26, a compression spring 32 is preferably provided at the distal end of the arm which is conveniently retained in confronting shallow recesses formed in the valve plate 12 and the arm 16 so as to normally provide a separating force between the arm and the plate at that point tending to rock the plate about the pivot pin, whereby the valve plate will not have a totally free or unrestrained loose connection to the operating arm through the elongated slots 28. By the same token, the spring 32 also provides a yieldable accommodation to manufacturing tolerances and in bringing the extended end of the valve flap 12 into contact with the arm 16 adjacent the pivot mounting means 14 as a result of spring 32, the chance of dust accumulation from the grain or other material passing vertically through the valve opening is far less likely to accumulate at and render ineffective the pivot mounting means.

Accordingly, it will be seen that when shaft 22 is rotated in a clockwise direction as seen in FIG. 1, the pin 30 will bear against the ends of the slot 28 remote from the valve flap to pull the flap away from the seat 10 and conversely, counterclockwise rotation of shaft 22 will swing the flap plate toward the seat 10 as pin 30 bears against the other ends of the slots 28. The arm 16 when exerting opening force on the flap is preferably slightly spaced from the adjacent flap surface.

Figure 2:
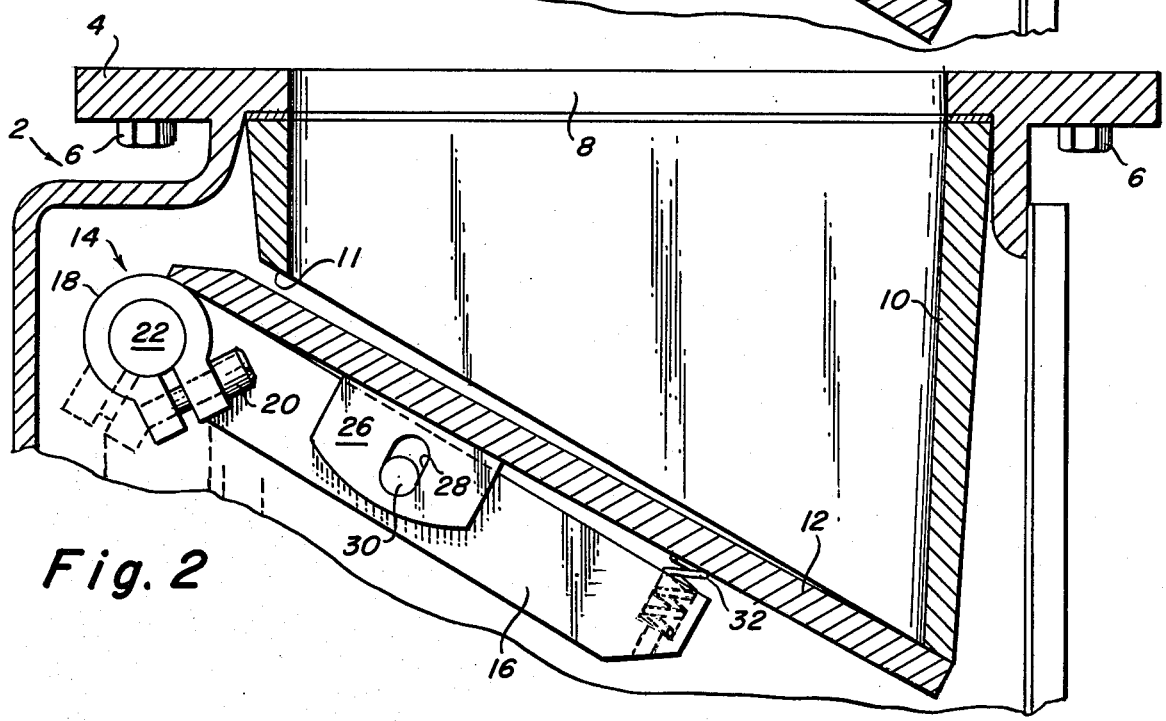
FIG. 2 is a view similar to FIG. 1 but wherein the valve is shown in its initially cracked open position prior to full opening thereof; and, FIG. 3 is a sectional view illustrating the connection between the operating lever and the valve flap.

Importantly, the pin or other connection between the arm 16 and the valve flap 12 is eccentric or offset to the relative center of the valve plate, and is appreciably nearer the edge thereof near shaft 22 as clearly seen in the drawings. As a consequence, upon application of valve opening force against a relative vacuum in the passageway 8, greater force will be exerted along the proximate left-hand edge of the valve plate at the seating face 11, whereby the valve plate will initially break loose from the seat at the left-hand edge as shown in FIG. 2, the right-hand edge of the valve plate remaining in contact with the valve seat thereat and initially pivoting with respect thereto and as urged by spring 32.

It will be seen, then, that opening force is relatively concentrated along the left-hand edge to initially crack the plate open to relieve any vacuum present after which the plate will swing open readily. This contrasts sharply with the forces required when the connection to the valve flap plate is located substantially centrally thereof which requires that the entire valve plate break away substantially simultaneously about its entire periphery from the valve seat. Such simultaneous plate separation may require two to three times the power required for the tilt-open technique of my invention.

While elongated or elliptical slots 28 have been shown with respect to the connection to the operating arm 16, the connection may be a simple pivoted connection rather than a lost motion arrangement as shown. In such case the arm 16 would also be in slightly spaced relation to the adjacent face of the valve flap so as to permit the slight relative pivoting motion in opening the near side of the valve flap in the initial separation of the valve flap from its polished seating surface 11.

While I have shown a preferred form of my invention, it is to be understood that the same is capable of variations and modifications while still embracing the concept and scope thereof as defined by the accompanying claims.

I claim:

1. In a dust trap defining a flow path axially generally vertically therethrough including a valve seat defining a central opening and having a peripheral seating surface thereon, a matching valve flap for covering said opening and seating upon said seating surface to close the valve, and means mounting said valve flap for pivotal movement between opening and closed positions including a rotatable shaft disposed laterally adjacent said opening and one edge of said flap, and an operating arm extending therefrom across a major portion of said flap, the improvement therein comprising freely pivotable means connecting said arm to said valve flap in normally spaced relation thereto and at an eccentric location with respect to the center of said flap with said eccentric location disposed nearer one side of said seating surface toward said mounting means that to the side opposite therefrom, a compression spring interposed between said flap and said arm adjacent the distal end thereof and on said flap opposite side, thereby to provide a mechanical advantage in breaking the portion of said valve flap nearest said connection away from said valve seat and into contact with the said arm adjacent said mounting means to minimize dust collection thereat while the opposite side of said valve flap remains initial fulcrum contact with said valve seat.

2. The improved dust trap of claim 1 wherein said valve flap includes a pair of spaced upstanding ears, and said operating arm is disposed between said ears.

3. The improved dust trap of claim 2 wherein said ears and said arm have aligned apertures therein, and a pin extends transversely therebetween to interconnect the same to permit free pivoting motion.

4. The improved dust rap of claim 1 wherein said trap is of the type having means removably securing the valve seat therein.

* * * * *